United States Patent [19]

Parker

[11] Patent Number: 5,626,376

[45] Date of Patent: May 6, 1997

[54] IMPACT BUMPER APPARATUS AND METHOD

[76] Inventor: Lloyd J. Parker, 2020 Nottingham Cir., Junction City, Kans. 66441

[21] Appl. No.: 300,921

[22] Filed: Sep. 6, 1994

[51] Int. Cl.$^6$ ................................................. B60R 19/02
[52] U.S. Cl. ........................................... 293/102; 293/133
[58] Field of Search ........................... 293/102, 132, 293/133, 146, 147, 149, 150, 151, 152, 153, 154, 155, 143, 14, 15, 48, 112

[56] References Cited

U.S. PATENT DOCUMENTS 2,194,459  3/1940  Frank ........................................ 293/143
3,318,617  5/1967  Burns ...................................... 293/102 X
4,541,661  9/1985  Hawk ...................................... 293/132 X

*Primary Examiner*—David M. Mitchell
*Assistant Examiner*—Kia M. Robinson
*Attorney, Agent, or Firm*—John W. Carpenter

[57] ABSTRACT

An impact bumper apparatus and method for absorbing an impact delivered to a vehicle comprising a pair of contiguous, generally hollow longitudinal tubular members adapted to absorbing an impact by crumpling, interconnected by at least one spacer, at least one trapezoidal shaped guide assembly, and at least one support assembly. The guide assembly absorbs impact and effects an upward change in the direction of the impact, and the support assembly absorbs impact and effects a downward change in the direction of the impact.

11 Claims, 4 Drawing Sheets

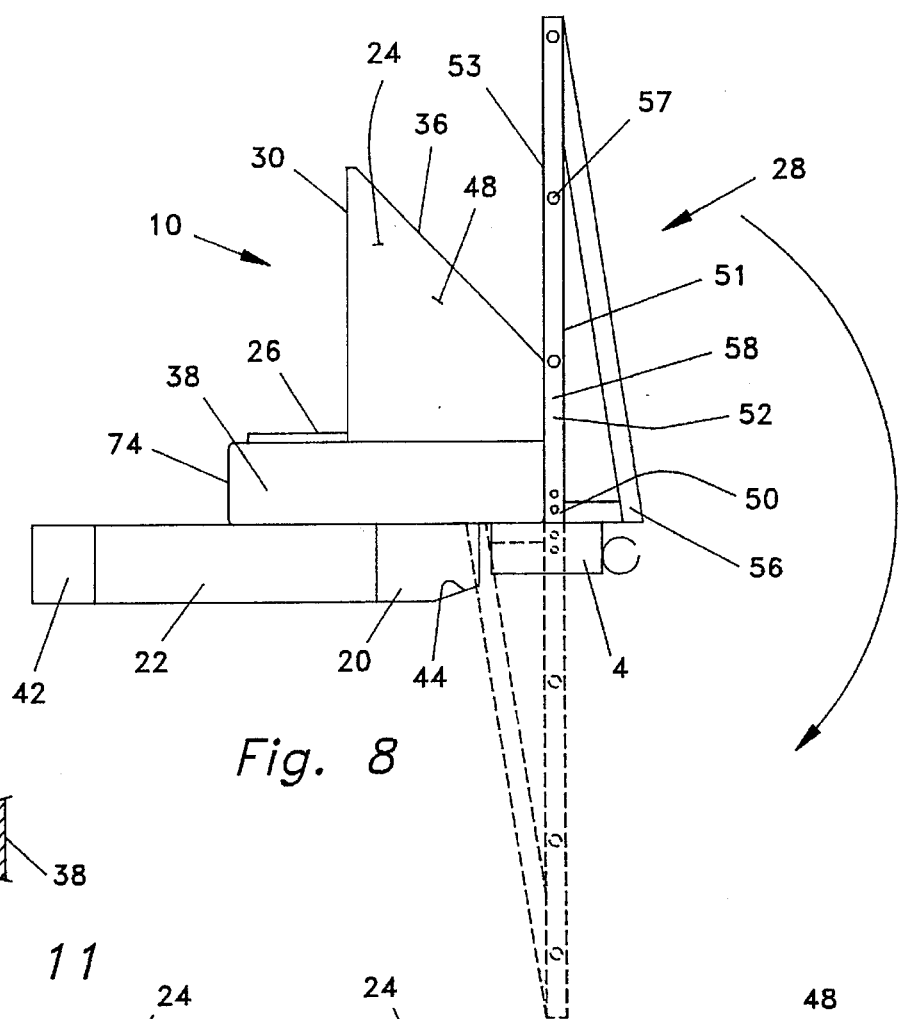

IMPACT BUMPER APPARATUS AND METHOD

FIELD OF THE INVENTION.

This invention is generally related to a bumper for trucks. More specifically, the present invention is directed to a rear bumper assembly for heavy duty military vehicles.

BACKGROUND OF THE INVENTION

Military vehicles, such as HEMTT Tankers, are often moved in convoys, usually at close intervals, and at a fairly rapid pace, such as highway speed. The nature of the transportation of these vehicles produces a high rate of rear-end collisions, usually by other HEMTT Tankers, and the damage to the tankers is usually extensive, requiring an average down time of 15 days per vehicle for repair. According to one study conducted at Fort Riley, Kansas, the 1st Infantry Division experienced fourteen (14) accidents in the course of one year that involved HEMTT Tankers, each with an average repair bill exceeding the cost of a midpriced new automobile. It can therefore be seen that the need for reducing the costs of such accidents is great. Accordingly, what has been provided to meet such need is a bumper, one embodiment particularly adapted for military vehicles, capable of withstanding rear end collisions and reducing damage to the tanker.

A patentability search was conducted and the following U.S. Patents were found:

U.S. Pat. No. Des. 157,321 to Barden; U.S. Pat. No. Des. 173,050 to Braunberger; U.S. Pat. No. Des. 212,939 to Nunn; U.S. Pat. No. Des. 269,423 to Waite; U.S. Pat. No. Des. 280,891 to Belsky; U.S. Pat. No. Des. 279,924 to Trinnaman; U.S. Pat. No. 1,556,883 to Wertz; U.S. Pat. No. 1,626,283 to Jensen; U.S. Pat. No. 1,886,197 to Kramer; U.S. Pat. No. 2,026,826 to Dillon; U.S. Pat. No. 2,036,607 to Robinson; U.S. Pat. No. 2,057,015 to Davis; U.S. Pat. No. 2,061,117 to Thwaits; U.S. Pat. No. 2,091,731 to Gredell; U.S. Pat. No. 2,106,206 to Crossen, Jr,; U.S. Pat. No. 2,168,615 to Bernstein; and U.S. Pat. No. 2,211,239 to Liston.

The U.S. Pat. No. 1,556,883 to Wertz teaches the mounting of tanks upon motor vehicles of the type useful for example in transporting and dispensing of gasoline, lubricating oils or other liquid commodities.

The U.S. Pat. No. 1,626,283 to Jensen teaches a system for control of emergency valves of tanks of vehicles from either end of said vehicle.

The U.S. Pat. No. 1,886,197 to Kramer teaches a semi trailer tank vehicle comprising a vehicle tank so made as to obtain a lower center of gravity.

The U.S. Pat. No. 2,026,826 to Dillon teaches a frameless tank vehicle for supporting a load being transported and/or the transmission and power units utilized in propelling the vehicle.

The U.S. Pat. No. 2,036,607 to Robinson teaches an improved tank trailer for reducing weight of a loaded trailer at the road and increasing the total load capacity of the trailer.

The U.S. Pat. No. 2,057,015 to Davis teaches a bumper assembly for truck tanks or trailer tanks which hingeably secured to the tank truck or tank trailer.

The U.S. Pat. No. 2,061,117 to Thwaits teaches an improved tank trailer that is lighter in construction by using the tank as a supporting beam for the load imposed by the tank and an independent trailer assembly that cradles the tank.

The U.S. Pat. No. 2,091,731 to Gredell teaches an improved tank assembly for use in trucks or trailers having an improved strength/weight ratio by combining the wheel housing with a cross girder.

The U.S. Pat. No. 2,106,206 to Crossen, Jr, teaches moveable panels for permitting or restricting access to a dispensing means of a tank vehicle which may be locked and unlocked.

The U.S. Pat. No. 2,168,615 to Bernstein teaches an improved tank structure for tank trailers with reinforced indentions which improve strength of the tank and provide hose storage means.

The U.S. Pat. No. 2,211,239 to Liston teaches an improved tank construction for vehicles comprising using high tensile strength steel to reduce the weight of the tank, and forming the tank in partitions to achieve use of the high tensile strength steel. None of the foregoing prior art U.S. Patents teach or suggest the particular method or apparatus of the present invention.

SUMMARY OF THE INVENTION

The present invention accomplishes its desired objects broadly by providing an impact bumper for use on vehicles, especially military vehicles, for receiving, absorbing and/or changing a direction of an impact received. The impact bumper broadly comprises a first generally hollow longitudinal member contiguously coupled to a second generally hollow longitudinal member (14) with at least one generally hollow spacer member (16) secured to the first generally hollow longitudinal member (12) and to the second generally hollow longitudinal member (14). At least one generally hollow guide assembly (24) is interconnected between the first generally hollow longitudinal member and the second generally hollow longitudinal member. The hollow guide assembly has a slanted surface (36) for receiving, absorbing and elevating a direction of an impact force. The hollow guide assembly typically comprises a first guide plate member (34) normal to and secured to the first generally hollow longitudinal member (12), a second guide plate member (32) normal to and secured to the first generally hollow longitudinal member (12) a third guide plate member (30) normal to and secured to the second generally hollow longitudinal member (14). A top guide plate member is secured to the first guide plate member (34), the second guide plate member (32), and the third guide plate member (30) and defines the slanted surface (36). The least one base support assembly (20–22) is secured to the first generally hollow longitudinal member (12) and to the second generally hollow longitudinal member (14) for absorbing and lowering a direction of an impact force. The base support assembly (20–22) generally comprises an outer support plate (20) and an inner support plate (22). The outer support plate (20) comprises an outer support angled end (40) normal to the first generally longitudinal member (12) and to the second generally longitudinal member (14), and the inner support plate (22) likewise comprises an outer support angled end (42) normal to the first generally longitudinal member (12) and to the second generally longitudinal member (14). The outer support angled end (42) further comprises an outer beveled end (44) having an angular cut-out disposed therein for receiving an impact and redirecting same downward. Typically, the outer support plate (20) and the inner support plate (22) are parallel and the outer support angled end (40) is parallel to the inner support angled end (42).

The present invention further accomplishes its desired objects by broadly providing a method for absorbing and changing the directional vector of an impact force comprising the steps of:

(a) providing an impact bumper comprising a first generally longitudinal member (12), a second generally hollow longitudinal member (14), at least one generally hollow spacer member (16) secured to the first generally hollow longitudinal member (12) and to the second generally hollow longitudinal member (14), at least one generally hollow guide assembly (24) having a slanted surface (36) and being secured to the first generally hollow longitudinal member (12) and the second generally hollow longitudinal member (14) for absorbing and elevating a direction of an impact force, and at least one base support assembly (20–22) secured to the first generally hollow longitudinal member (12) and to the second generally hollow longitudinal member (14);

(b) providing a vehicle;

(c) coupling the impact bumper to the vehicle;

(d) impacting the impact bumper with a force comprising a substantially horizontal directional vector; and (e) absorbing the force by crumpling the impact bumper. The method further comprises changing the direction of the force by guiding the source of the impact force upwards along the slanted surface (36) of the guide assembly (24) or guiding the source of the impact force downward along the beveled end (44) of the outer support assembly (20).

These, together with the various ancillary objects and features which will become apparent to those skilled in the art as the following description proceeds, are attained by this novel apparatus and method for receiving and absorbing impact force, a preferred embodiment as shown with reference to the accompanying drawings, by way of example only, wherein;

BRIEF DESCRIPTION OF THE DRAWINGS

FIG. 8 is a side elevational view of the impact bumper of FIG. 1 with the ladder in a raised position and the dashed lines showing the ladder in a lowered position;

FIG. 9 is a front elevational view of the impact bumper of FIG. 2;

FIG. 10 is a rear elevational view of the impact bumper of FIG. 2;

FIG. 11 is a vertical sectional view of the impact bumper taken in direction of the arrows and along the plane of line 11—11 in FIG. 2;

DETAILED DESCRIPTION OF THE INVENTION

Figure 2:
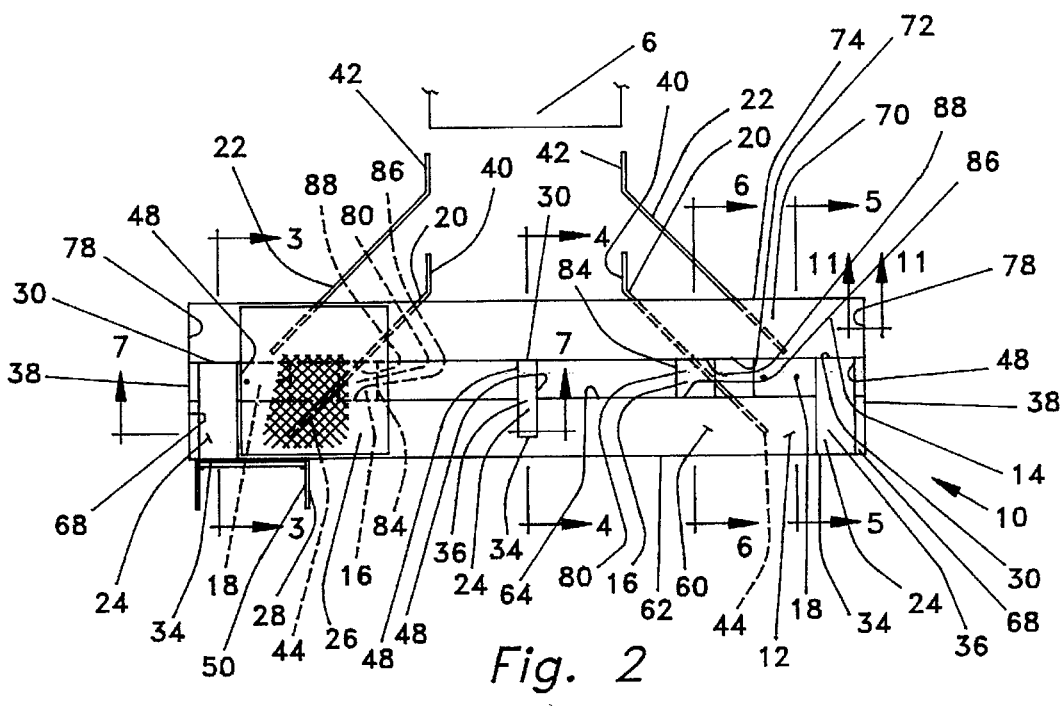
FIG. 2 is a top plan view of the impact bumper disclosing angular support members in partially dashed lines and having the ladder removed therefrom and the trailer hitch removed therefrom.

Turning now to the drawings wherein similar parts of the invention are identified by like reference numbers, there is seen the impact truck bumper assembly of the invention, generally illustrated as 10. The bumper is essentially a tubular structure comprising a plurality of interconnected, hollow elements (all of which will be identified below) for absorbing a rear impact from a truck, automobile, or the like. More specifically, the impact bumper 10 includes a pair of parallel tubular members 12–14 (which are preferably square or rectangular in cross section). The tubular members 12–14 are intermedially connected by at least one hollow spacer member 16, preferably a pair of spacer members 16—16 as shown in FIG. 2. The tubular members 12–14 are also connected together by a pair of opposed end plate members 38—38 and by a pair of opposed bottom plate members 18—18.

The tubular member 12, as best shown in FIGS. 2, 9, and 10, comprises a top side 60, interconnected with a front side 62 and a back side 64, a bottom side 66, interconnected with the front side 62 and the back side 64, and defines a pair of opposed ends 68—68. Likewise, the tubular member 14 comprises a top side 70, interconnected with a front side 72 and a back side 64, a bottom side 76, interconnected with the front side 72 and the back side 74, and defines a pair of opposed ends 78—78. Similarly, the spacer member 16 comprises a top 80, a pair of sides 84—84 secured to the top 80, a bottom 82 secured to the sides 84—84, and defines a front end 86 and a rear end 88. Thus the end plate members 38—38, as best seen in FIG. 2, interconnect the ends 68—68 of the tubular member 12 and the ends 78—78 of the tubular member 14, such that one end plate 38 interconnects one end 66 of the tubular member 12 and one end 76 of the tubular member 14 and the other end plate 38 interconnects the other end 68 of the tubular member 12 and the other end 76 of the tubular member 14. Further, the bottom plate members 18—18 are situated such that one bottom plate member 18 interconnects the bottom 66 of the tubular member 12, the bottom 76 of the tubular member 14, and the end plate 38 (it may be appreciated that the respective ends 68–78 of the tubular members 12–14 are also interconnected therebetween); and the other bottom plate member 18 interconnects the bottom 66 of the tubular member 12, the bottom 76 of the tubular member 14, and the other end plate 38.

The spacer member 16, is disposed between the tubular member 12 and the tubular member 14 for creating a space between the tubular members 12–14. As previously mentioned, the impact bumper 10, in one preferred embodiment comprises two of the spacer members 16—16 disposed between the tubular members 12–14, as shown in FIG. 2, preferably such that the spacer members 16—16 are typically equispaced. Each spacer member 16 is disposed between the tubular members 12–14 such that the front end 86—86 of each spacer 16,16 is secured to the back side 64 of the tubular member 12 and the back end 88—88 of each spacer member 16—16 is secured to the front side 72 of the tubular member 14.

Figure 1:
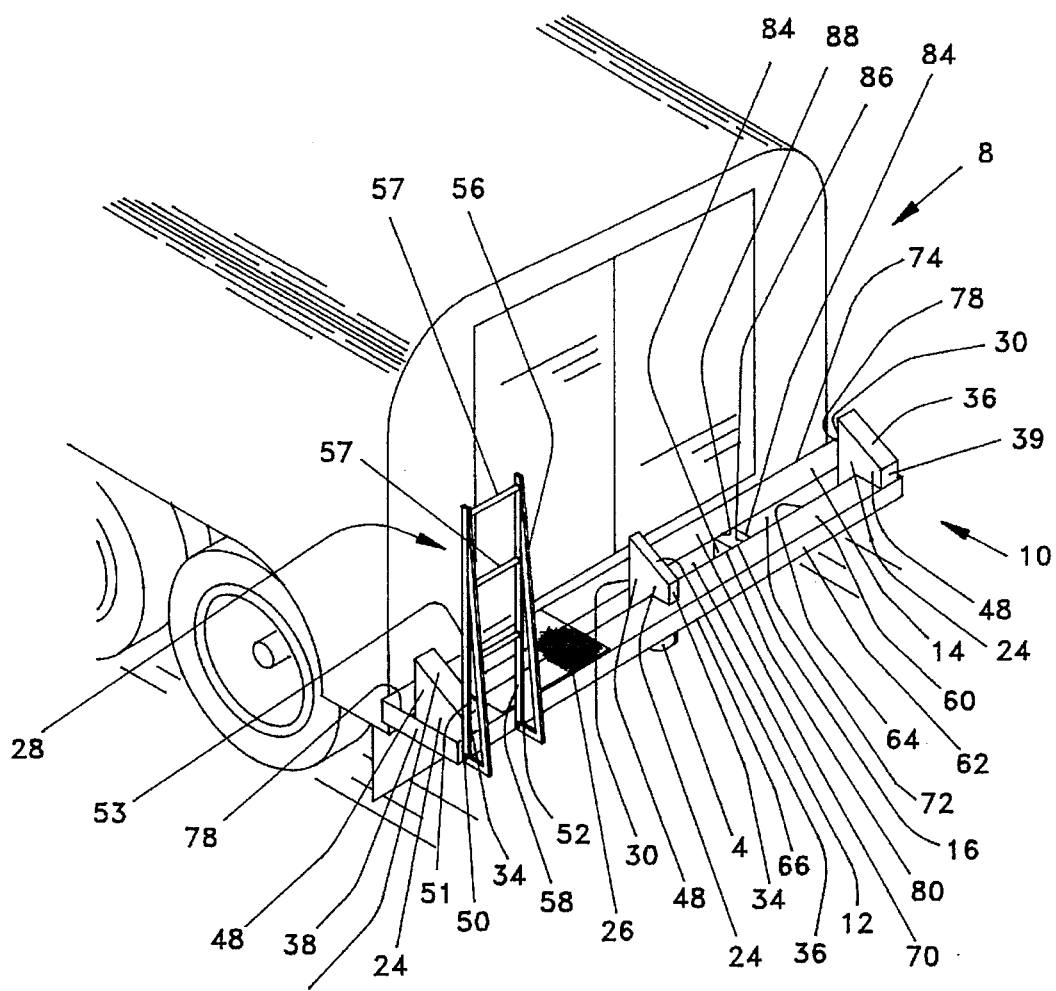
FIG. 1 is a perspective view of the impact bumper secured to a vehicle disclosing a ladder in a raised position and a trailer hitch secured thereto.
Figure 3:
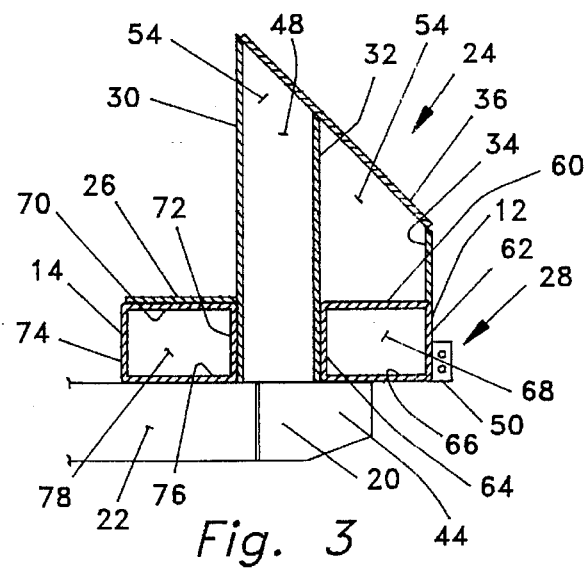
FIG. 3 is a vertical sectional view of the impact bumper taken in direction of the arrows and along the plane of line 3—3 in FIG. 2.
Figure 4:
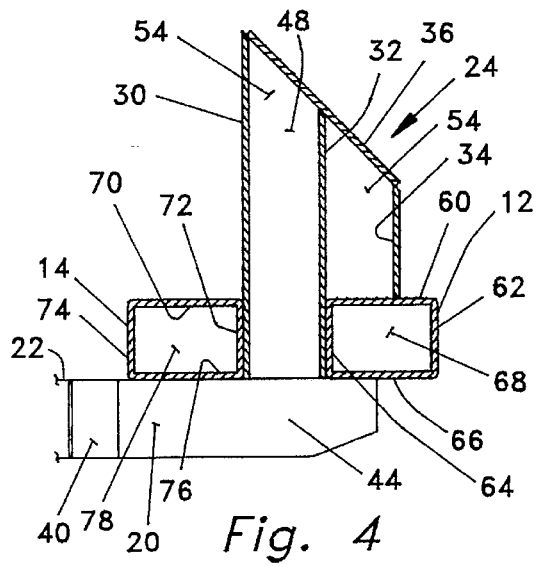
FIG. 4 is a vertical sectional view of the impact bumper taken in direction of the arrows and along the plane of line 4—4 in FIG. 2.
Figure 5:
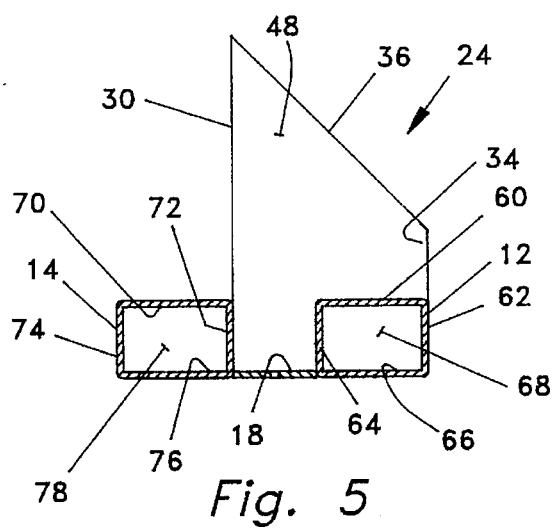
FIG. 5 is a vertical sectional view of the impact bumper taken in direction of the arrows and along the plane of line 5—5 in FIG. 2.

The impact bumper 10 also comprises at least one hollow guide assembly, generally illustrated as 24 in FIG. 1. In a preferred embodiment of the impact bumper 10, such as the one depicted by FIG. 1, at least three (3) guide assemblies 24—24—24 are employed for interconnecting the tubular members 12–14 and absorbing impact force. Each guide assembly 24 has three generally parallel, vertically disposed plate members 30, 32, and 34. Two of the hollow plate members 32–34 are connected to the hollow tube member 12, and the other plate member 30, as best shown in FIGS. 3 and 4, is connected to the tubular member 14. More specifically, the hollow plate member 32 is secured to the back side 64 of the tubular member 12, the hollow plate member 34 is secured to the front side 62 of the tubular member 12, and the hollow plate member 30 is secured to the front side 72 of the tubular member 14. The plate members 30-32-34 decrease in length in the order stated such that when a guide plate 36 is secured to the extreme top edges of the plates 30–32–34, the guide plate 36 functions as a guiding surface for absorbing and directing any impact force (in the case that the contacting surface is generally impacting in a vector that is in line with the guide plate 36). Thus, as seen in FIG. 1, the guide plate 36 of each guide assembly 24—24—24 is upwardly inclined from the front side 62 of the tubular member 12 to the front side 72 of the tubular member 14. A pair of generally trapezoidal shaped, opposed side walls 48—48 is secured to each guide assembly 24 such that the opposed side walls 48 interconnect the guide plate member 36 and the vertically disposed plate members 30,32, and 34.

The impact bumper 10, in one preferred embodiment, comprises two (2) pairs of opposed eskewed shaped support plate members 20–22, 20–22 (as best seen in FIGS. 2, 9, and 10), more specifically shaped as a straight plate with respective ends 40–42, 40–42 formed with an obtuse angle. As best seen in FIG. 2, the ends 40–42, 40–42 of the respective pairs of support plate members 20–22, 20–22 are normal to the respective bottom sides 66–76 of the tubular members 12–14, normal to the longitudinal length of the tubular members 12–14, and are adapted for securing the impact bumper 10 to the frame of a vehicle 8. The support plate members 20–22, 20–22 also serve to further interconnect the tubular plate members 12–14, by securing to the respective bottom sides 66–76. As further best seen in FIG. 9, the support plate members 20—20 comprise beveled or notched ends 44—44 for guiding an impact force downward (in the case that the contacting surface in generally impacting in a vector that is in line with the notched ends 44—44).

A ladder assembly 28 is secured to the tubular member 12 and, as best shown in FIG. 8, comprises a bracket member 50 having a ladder member 52 pivotally or hingeably secured thereto. The ladder member 52 comprises rungs 57 disposed between a pair of opposed stanchions 58—58 and defines a front side 53 and a back side 51. A pair of triangular support members 56—56 is secured to the back side 51 of the ladder assembly 28 for adding additional strength. A grid member 26 interconnects the respective top sides 60–70 of the tubular members 12–14 and serves as a supporting surface for a person that may climb the ladder member 52 (when the ladder member 52 is in a lowered position, as shown in dashed lines in FIG. 8). Therefore, and as best shown in FIG. 1, the grid member 26 is typically in close proximity to the ladder assembly 28.

Continuing to refer to the drawings for operation and use of the invention, there is seen in FIG. 1 the impact bumper 10 of the invention, having the generally hollow tubular members 12–14 interconnected by the end plate members 38—38, the bottom plate members 18—18, the support members 16—16, the guide assemblies 24—24—24, and the support members 20–22, 20–22 (see FIG. 2). The impact bumper 10 is secured to a frame 6 the vehicle 8 (see FIG. 2) by any suitable means, such as by way of example, bolt members or welds. The angled ends 40–42, 40–42 of the respective support members 20–22, 20–22 are secured the frame 6 of the vehicle 8 for fixedly securing the impact bumper 10 to the vehicle 8.

Figure 12:
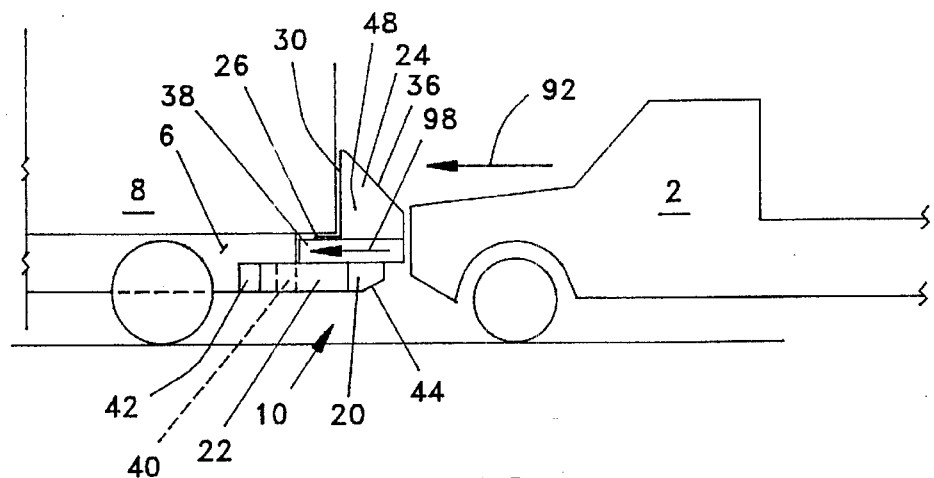
FIG. 12 is a schematic view of the impact bumper of FIG. 2 disposed on a vehicle with another vehicle impacting the impact bumper in a head-on fashion and generating forces in the direction of the arrows.

The tubular members 12–14, as previously indicated, in one preferred embodiment are fabricated from hollow tubular steel which is typically rectangular or square. The hollow structure of the tubular members 12–14 is suited for absorbing an impact of a vehicle or the like striking or impacting the bumper squarely. Thus, as depicted by FIG. 12, when an impacting vehicle 2 delivers force, indicated by the arrow 92, to the impact bumper 10, the impact bumper 10 absorbs the force 92 into itself, as indicated by arrow 98, by crumpling or bending. Typically, the support members 20–22 bend to absorb some of the force 92, and the tubular members 12–14 and the spacer members 16—16 (as seen in FIG. 2) absorb the remainder of the force by crumpling.

Figure 6:
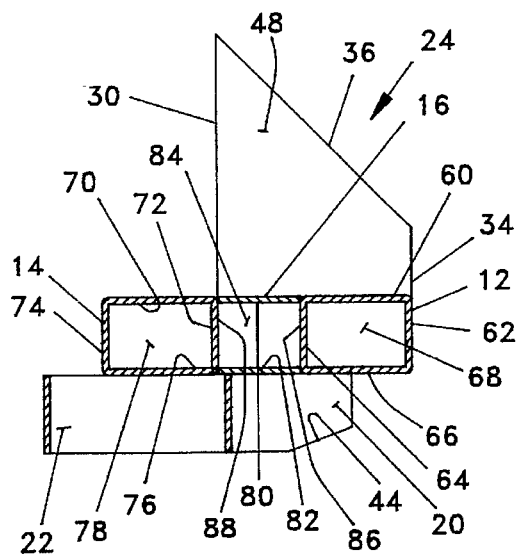
FIG. 6 is a vertical sectional view of the impact bumper taken in direction of the arrows and along the plane of line 6—6 in FIG. 2.
Figure 7:
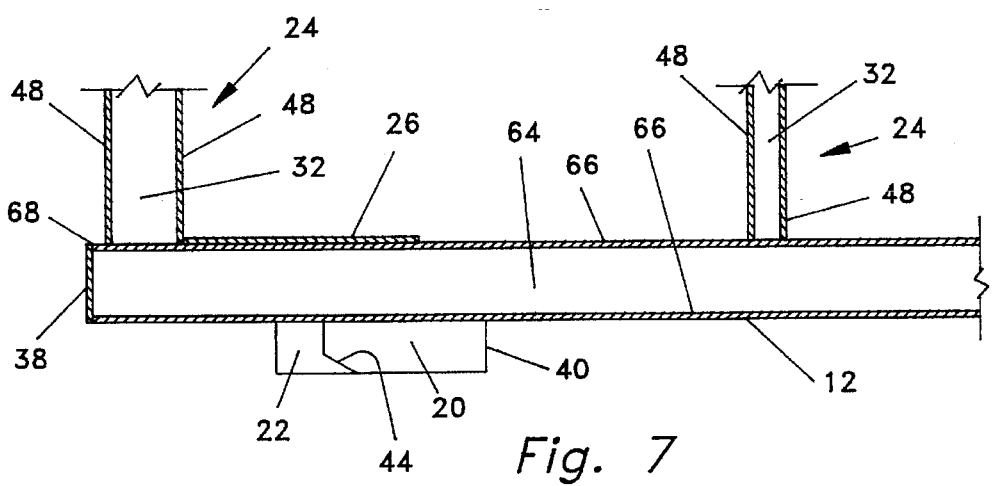
FIG. 7 is a vertical sectional view of the impact bumper taken in direction of the arrows and along the plane of line 7—7 in FIG. 2.
Figure 13:
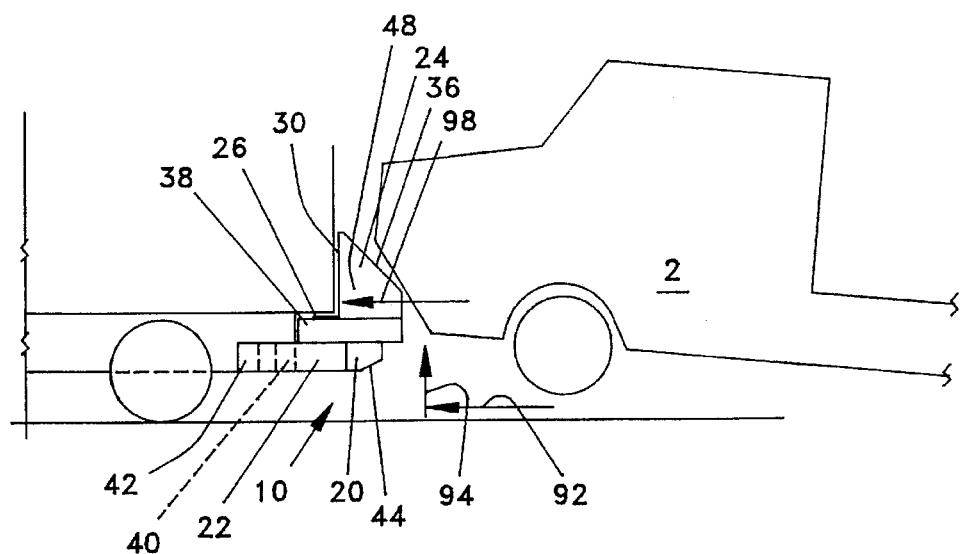
FIG. 13 is a schematic view of the impact bumper of FIG. 2 dipsosed on a vehicle with another vehicle impacting a guide assembly and generating impact forces in the directions of the arrows.

In another scenario, as depicted by FIG. 13, impact force 92 is transferred to the guide assemblies 24—24—24 (see FIG. 2). The guide assemblies 24—24—24 are fabricated such that interstitial spaces 54—54—54 exist inside each guide assembly 24, as shown in FIGS. 3 and 4, between the vertical guide plate members 30, 32, and 34 for absorbing impact from the colliding vehicle 2 or the like. Similarly, the support members 16—16, as shown in FIG. 6, are designed to crumple and absorb force as a colliding vehicle 2 strikes the impact bumper 10. The angular disposition of the guide plate member 36, as shown in FIGS. 3, 4, and 13, effects a change in direction of a colliding vehicle 2 to reduce the momentum of the colliding vehicle 2 by directing the colliding vehicle 2 upwards against gravity, as indicated by arrow 94 in FIG. 13. Additionally, the guide assemblies 24—24—24 (see FIG. 2) are designed to crumple under force 92 (see FIG. 13) and correspondingly crumple somewhat, as indicated by arrow 98.

Figure 14:
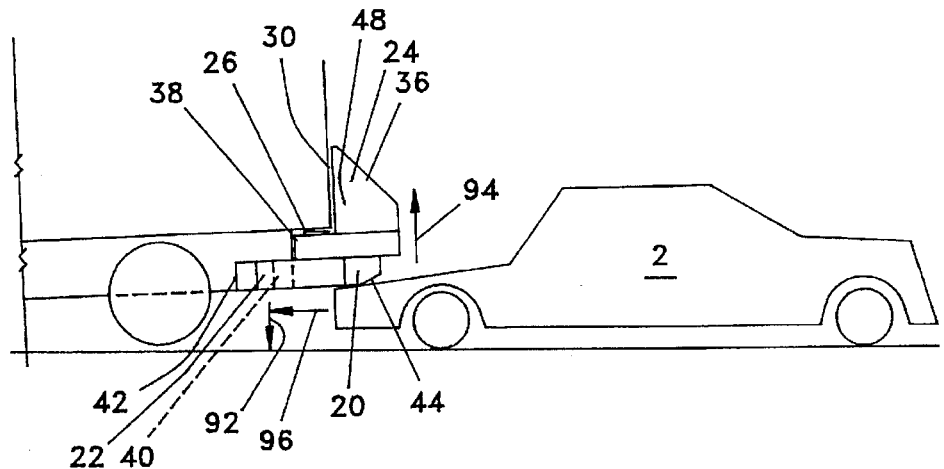
FIG. 14 is a schematic view of the impact bumper of FIG. 2 disposed on a vehicle with another vehicle impacting a support assembly and generating impact forces in the directions of the arrows.

Similarly, in the case of a low-slung colliding vehicle 2, as shown in FIG. 14, the angled ends 44—44 of the support plate members 20—20 guide the colliding vehicle 2 downward, effecting a change in the direction of the impact force 92 by wedging the colliding vehicle 2 underneath the impact bumper 10 such that the vehicle 2 engages the angled ends 44—44 of the support plate members 20—20 (see FIG. 9) and simultaneously effecting a reduction in the force of the impact by lifting the vehicle 8, as indicated by arrow 94, against gravity, as indicated by arrow 96.

In the case that the impact bumper 10 is not hit squarely (i.e. in a horizontal vector that is normal to the tubular members 12–14) the angled support plate members 20–22, 20–22 (see FIG. 2) absorb the force of the impact by bending, while the end plate members 38—38, the bottom plate members 18—18, the support members 16—16, and the vertical plate members 30 and 32 of the guide assemblies 24—24—24 receive a portion of the force of the impact and absorb a portion of the force by crumpling and/or bending.

It may be appreciated that the impact bumper 10 is adapted to having a hitch member 4 (as shown in FIG. 1)

secured to the bumper 10 for towing a trailer, another vehicle, or the like. Any suitable hitch member 4 may be employed, as taught by the art, without departing from the spirit and/or scope of the invention.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the scope of the invention as set forth.

I claim:

1. An impact bumper comprising a first generally hollow longitudinal member (12); a second generally hollow longitudinal member (14); at least one generally hollow spacer member (16) secured to said first generally hollow longitudinal member (12) and to said second generally hollow longitudinal member (14); at least one generally hollow guide assembly (24) having a slanted surface (36) and being secured to said first generally hollow longitudinal member (12) and said second generally hollow longitudinal member (14) for absorbing and elevating a direction of an impact force; and at least one base support assembly (20–22) secured to said first generally hollow longitudinal member (12) and to said second generally hollow longitudinal member (14) for absorbing and lowering a direction of an impact force; said least one generally hollow guide assembly (24) additionally comprising a first guide plate member (34) normal to and secured to said first generally hollow longitudinal member (12); a second guide plate member (32) normal to and secured to said first generally hollow longitudinal member (12); a third guide plate member (30) normal to and secured to said second generally hollow longitudinal member (14); and a top guide plate member secured to said first guide plate member (34), said second guide plate member (32), and said third guide plate member (30) for defining said slanted surface (36); said least one guide assembly additionally comprising an outer left guide assembly, an outer right guide assembly, and an inner guide assembly equispaced from said outer left guide assembly and said outer right guide assembly.

2. The impact bumper of claim 1 wherein said outer left guide assembly comprises a first left guide plate member (34) normal to and secured to said first generally hollow longitudinal member (12), a second left guide plate member (32) normal to and secured to said first generally hollow longitudinal member (12), a third left guide plate member (30) normal to and secured to said second generally hollow longitudinal member (14), and a left top guide plate member secured to said first left guide plate member (34), said second left guide plate member (32), and said third left guide plate member for defining a left slanted surface; said outer right guide assembly comprising a first right guide plate member (34) normal to and secured to said first generally hollow longitudinal member (12), a second right guide plate member (32) normal to and secured to said first generally hollow longitudinal member (12), a third right guide plate member (30) normal to and secured to said second generally hollow longitudinal member (14), and a right top guide plate member secured to said first right guide plate member (34), said second right guide plate member (32), and said third right guide plate member for defining a right slanted surface; and said inner guide assembly comprising a first inner guide plate member (34) normal to and secured to said first generally hollow longitudinal member (12), a second inner guide plate member (32) normal to and secured to said first generally hollow longitudinal member (12), a third inner guide plate member (30) normal to and secured to said second generally hollow longitudinal member (14), and an inner top guide plate member secured to said first inner guide plate member (34), said second inner guide plate member (32), and said third inner guide plate member for defining an inner slanted surface.

3. The impact bumper of claim 2 where said generally hollow spacer member (16) comprises a generally rectangular box-like structure connected to said first generally hollow longitudinal member (12) and said second generally hollow longitudinal member (14).

4. The impact bumper of claim 1 wherein said generally hollow spacer member (16) comprises a generally rectangular box-like structure connected to said first generally hollow longitudinal member (12) and said second generally hollow longitudinal member (14).

5. The impact bumper of claim 3 wherein said least one base support assembly (20–22) comprises an outer support plate and an inner support plate; said outer support plate (20) comprising an outer support angled end (40) normal to said first generally longitudinal member (12) and to said second generally longitudinal member (14); said inner support plate (22) comprising an outer support angled end (42) normal to said first generally longitudinal member (12) and to said second generally longitudinal member (14) and an outer beveled end (44) having a angular cut-out disposed therein; said outer support plate (20) and said inner support plate (22) being parallel; and said outer support angled end (40) being parallel to said inner support angled end (42).

6. The impact bumper of claim 4 wherein said least one base support assembly (20–22) comprises an outer support plate and an inner support plate; said outer support plate (20) comprising an outer support angled end (40) normal to said first generally longitudinal member (12) and to said second generally longitudinal member (14); said inner support plate (22) comprising an outer support angled end (42) normal to said first generally longitudinal member (12) and to said second generally longitudinal member (14) and an outer beveled end (44) having a angular cut-out disposed therein; said outer support plate (20) and said inner support plate (22) being parallel; and said outer support angled end (40) being parallel to said inner support angled end (42).

7. The impact bumper of claim 5 additionally comprising a ladder assembly (28) coupled to said first generally longitudinal member (12); said ladder assembly comprising a bracket member (50) secured to said first generally longitudinal member (12), a ladder member (52) pivotally connected to said bracket and defining a front side (53) and a back-side (51), and a pair of triangular support members (56–56) secured to said front side (53) of said ladder member (52); said impact bumper further comprising a non-skid grid member (26) secured to said first generally longitudinal member (12) and to said second generally longitudinal member (14) for providing a walking surface in proximity to said ladder assembly (28); and at least one bottom support plate member (18) interconnecting said first generally longitudinal member (12) and said second generally longitudinal member (14).

8. The impact bumper of claim 6 additionally comprising a ladder assembly (28) coupled to said first generally longitudinal member (12); said ladder assembly comprising a bracket member (50) secured to said first generally longitudinal member (12), a ladder member (52) pivotally connected to said bracket and defining a front side (53) and a back side (51), and a pair of triangular support members (56–56) secured to said front side (53) of said ladder member (52); said impact bumper further comprising a non-skid grid member (26) secured to said first generally longitudinal member (12) and to said second generally longitudinal member (14) for providing a walking surface in proximity to said ladder assembly (28); and at least one bottom support plate member (18) interconnecting said first generally longitudinal member (12) and said second generally longitudinal member (14).

9. A method for absorbing and changing the directional vector of an impact force comprising the steps of:

(a) providing an impact bumper comprising a first generally longitudinal member (12), a second generally hollow longitudinal member (14), at least one generally hollow spacer member (16) secured to said first generally hollow longitudinal member (12) and to said second generally hollow longitudinal member (14), at least one generally hollow guide assembly (24) having a slanted surface (36) and being secured to said first generally hollow longitudinal member (12) and said second generally hollow longitudinal member (14) for absorbing and elevating a direction of an impact force, and at least one base support assembly (20–22) having a beveled end thereof (44) for guiding and directing a direction of an impact force, said least one base support assembly (20–22) being secured to said first generally hollow longitudinal member (12) and to said second generally hollow longitudinal member (14);

(b) providing a vehicle;

(c) coupling said impact bumper to said vehicle;

(d) impacting said impact bumper with a force comprising a substantially horizontal directional vector;

(e) striking said least one generally hollow guide assembly with said force;

(f) guiding said force upwards along said slanted surface (36) of said least one generally hollow guide assembly against gravity to absorb a portion of said force; and (g) simultaneously crumpling said generally hollow guide assembly to absorb a remaining portion of said force.

10. A method for absorbing an impact force comprising the steps of:

(a) providing an impact bumper comprising a first generally longitudinal member (12), a second generally hollow longitudinal member (14), at least one generally hollow spacer member (16) secured to said first generally hollow longitudinal member (12) and to said second generally hollow longitudinal member (14), at least one generally hollow guide assembly (24) having a slanted surface (36) and being secured to said first generally hollow longitudinal member (12) and said second generally hollow longitudinal member (14) for absorbing and elevating a direction of an impact force, and at least one base support assembly (22–22) having a beveled end thereof (44), said least one base support assembly (22–22) being secured to said first generally hollow longitudinal member (12) and to said second generally hollow longitudinal member (14);

(b) providing a vehicle (8);

(c) coupling said impact bumper (10) to said vehicle (8);

(d) impacting said impact bumper (10) with a force having a substantially horizontal directional vector;

(e) striking said beveled end of said least one base support assembly with said force having said substantially horizontal vector; and (f) guiding said vehicle (8) upwards against gravity as said force engages said beveled end (44) to absorb said force.

11. A method for absorbing an impact force comprising the steps of:

(a) providing an impact bumper comprising a first generally longitudinal member (12), a second generally hollow longitudinal member (14), at least one generally hollow spacer member (16) secured to said first generally hollow longitudinal member (12) and to said second generally hollow longitudinal member (14), at least one generally hollow guide assembly (24) having a slanted surface (36) and being secured to said first generally hollow longitudinal member (12) and said second generally hollow longitudinal member (14) for absorbing and elevating a direction of an impact force, and at least one base support assembly (22–22) having a beveled end thereof (44), said least one base support assembly (22–22) being secured to said first generally hollow longitudinal member (12) and to said second generally hollow longitudinal member (14);

(b) providing a vehicle (8);

(c) coupling said impact bumper (10) to said vehicle (8);

(d) impacting said impact bumper (10) with a force having a substantially horizontal directional vector;

(e) striking said first generally hollow longitudinal member (12) with said force; and (f) collapsing said first generally hollow longitudinal member (12) with said force to absorb same.

* * * * *